United States Patent
Wilken et al.

(10) Patent No.: US 12,073,177 B2
(45) Date of Patent: Aug. 27, 2024

(54) METHOD AND APPARATUS FOR IMPROVED AUTOMATIC SUBTITLE SEGMENTATION USING AN ARTIFICIAL NEURAL NETWORK MODEL

(71) Applicant: Applications Technology (AppTek), LLC, McLean, VA (US)

(72) Inventors: Patrick Wilken, Aachen (DE); Evgeny Matusov, Aachen (DE)

(73) Assignee: Applications Technology (AppTek), LLC, McLean, VA (US)

(*) Notice: Subject to any disclaimer, the term of this patent is extended or adjusted under 35 U.S.C. 154(b) by 218 days.

(21) Appl. No.: 16/876,780

(22) Filed: May 18, 2020

(65) Prior Publication Data

US 2020/0364402 A1 Nov. 19, 2020

Related U.S. Application Data

(60) Provisional application No. 62/849,530, filed on May 17, 2019.

(51) Int. Cl.
*G06F 40/279* (2020.01)
*G06F 40/30* (2020.01)
*G06F 40/47* (2020.01)
*G06N 3/08* (2023.01)

(52) U.S. Cl.
CPC ............ *G06F 40/279* (2020.01); *G06F 40/30* (2020.01); *G06F 40/47* (2020.01); *G06N 3/08* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 6,295,092 B1* | 9/2001 | Hullinger | H04H 60/66 348/E7.063 |
| 8,918,311 B1* | 12/2014 | Johnson | H04N 21/234336 715/251 |
| 9,456,170 B1* | 9/2016 | Miller | G11B 27/10 |
| 9,576,498 B1* | 2/2017 | Zimmerman | G09B 7/02 |
| 10,573,312 B1* | 2/2020 | Thomson | G10L 15/22 |
| 10,726,306 B1* | 7/2020 | Yang | G06V 10/768 |

(Continued)

OTHER PUBLICATIONS

Alvarez et al., Towards Customized Automatic Segmentation of Subtitles, 2014, Springer, pp. 1-10. (Year: 2014).*

(Continued)

*Primary Examiner* — Lamont M Spooner
(74) *Attorney, Agent, or Firm* — Bertin IP Law, PC

(57) ABSTRACT

A subtitle segmentation system employs a neural network model to find good segment boundaries. The model may be trained on millions of professionally segmented subtitles, and implicitly learns from data the underlying guidelines that professionals use. For controlling different characteristics of the output subtitles, the neural model may be combined with a number of heuristic features. To find the best segmentation according to the model combination, a dedicated beam search decoder may be implemented. The segmentation system incorporates a trained neural model comprising a word embedding layer, at least two bi-directional LSTM layers, a softmax layer and program instructions for segmenting text into subtitles.

13 Claims, 2 Drawing Sheets

(56) References Cited

U.S. PATENT DOCUMENTS

| | | | |
|---|---|---|---|
| 10,930,263 B1* | 2/2021 | Mahyar | G06N 3/088 |
| 11,350,178 B2* | 5/2022 | Choi | H04N 21/2335 |
| 2003/0055851 A1* | 3/2003 | Williamson | G06F 40/103 |
| | | | 715/251 |
| 2004/0125877 A1* | 7/2004 | Chang | G06F 16/739 |
| | | | 348/E5.065 |
| 2011/0167075 A1* | 7/2011 | King | G06F 16/152 |
| | | | 707/E17.014 |
| 2015/0296228 A1* | 10/2015 | Chen | H04N 21/8126 |
| | | | 725/34 |
| 2015/0347001 A1* | 12/2015 | Motoi | G06F 3/041 |
| | | | 345/173 |
| 2015/0363899 A1* | 12/2015 | Krause | G06Q 50/184 |
| | | | 705/26.3 |
| 2018/0300400 A1* | 10/2018 | Paulus | G06N 3/044 |
| 2019/0149834 A1* | 5/2019 | Zhou | H04N 19/187 |
| | | | 348/473 |
| 2019/0228269 A1* | 7/2019 | Brent | G06V 10/82 |
| 2019/0349641 A1* | 11/2019 | Choi | G10L 15/02 |
| 2020/0007902 A1* | 1/2020 | Li | H04N 21/435 |
| 2020/0034435 A1* | 1/2020 | Norouzi | G06N 3/0455 |
| 2020/0117856 A1* | 4/2020 | Kumar Karn | G06F 40/30 |
| 2020/0192986 A1* | 6/2020 | Zhang | G10L 15/22 |
| 2020/0226327 A1* | 7/2020 | Matusov | G06N 3/045 |
| 2020/0349381 A1* | 11/2020 | Wang | G06V 30/19173 |
| 2022/0014807 A1* | 1/2022 | Lin | G06V 20/635 |
| 2022/0021950 A1* | 1/2022 | Wei | H04N 21/44016 |

OTHER PUBLICATIONS

Lapjaturapit et al., Multi-Candidate Word Segmentation using Bi-directional LSTM Neural Networks, 2018, 2018 International Conference on Embedded Systems and Intelligent Technology & International Conference on Information and Communication Technology for Embedded Systems (ICESIT-ICICTES), pp. 1-6 (Year: 2018).*

UFLDL Tutorial, Softmax Regression, 2018, http://deeplearning.stanford.edu/tutorial/supervised/SoftmaxRegression/, pp. 1-8 (Year: 2018).*

Title={Controlling target features in neural machine translation via prefix constraints}, author=Takeno et al. booktitle={Proceedings of the 4th Workshop on Asian Translation (WAT2017)}, pp. ={55--63}, 2017 (Year: 2017).*

Pedersen et al., title={The FAR model: assessing quality in interlingual subtitling}, journal={Journal of Specialised Translation}, No. ={28}, No. ={28}, pp. ={210 -- 229}, year={2017} (Year: 2017).*

\* cited by examiner

METHOD AND APPARATUS FOR IMPROVED AUTOMATIC SUBTITLE SEGMENTATION USING AN ARTIFICIAL NEURAL NETWORK MODEL

CROSS REFERENCE TO RELATED APPLICATIONS

This application claims the benefit of priority of prior U.S. Provisional Patent Application No. 62/849,530, filed May 17, 2019, entitled "A Method for Improved Automatic Subtitle Segmentation Using An Artificial Neural Network Model," hereby incorporated by reference herein.

FIELD OF THE INVENTION

The present invention relates generally to speech processing systems and, more particularly, to systems and methods for generating and segmenting subtitles, including for improved readability in media.

BACKGROUND OF THE INVENTION

In automatic subtitling and subtitle translation systems, the final step—after a pipeline of audio segmentation, speech recognition and possibly machine translation—is to display the generated subtitles on the screen. For this, long subtitles have to be split into several lines or even several time frames to fit into a given area of the screen (usually two lines of 42 characters per line).

Professional human subtitlers commonly follow segmentation guidelines for this task. Those are meant to optimize the flow of reading. For example, line breaks separating articles from following nouns are avoided, whereas line breaks starting a new clause are encouraged.

Current automatic systems lack such informed segmentation decisions. Many ignore a semantically meaningful segmentation entirely and simply fill up lines with words until the character limit is reached. In other cases, heuristics based on punctuation marks or geometric rules are used to set reasonably good segment boundaries. In any case, the output of such a system is easily distinguishable from professionally generated subtitles, not only because of recognition or translation errors, but also because of the noticeably more disruptive and incorrect segmentation. There is a need for an automated system for generating subtitles that has high accuracy and also correctly segments text. There is a further need for the subtitles to be optimized and grammatically correct.

SUMMARY OF THE INVENTION

According to an embodiment of the invention, a subtitle segmentation system employs a neural network model to find good segment boundaries. The model may be trained on millions of professionally segmented subtitles, and implicitly learns from data the underlying guidelines that professionals use. For controlling different characteristics of the output subtitles, the neural model may be combined with a number of heuristic features. To find the best segmentation according to the model combination, a dedicated beam search decoder may be implemented.

According to one embodiment of the invention, a segmentation system incorporates neural models to generate the output of a text segmentation system. The system includes a memory and a processor. The memory stores text, segmentation penalties and a trained neural model comprising a word embedding layer, at least two bi-directional LSTM layers and a softmax layer. The memory may further store program instructions for segmenting text into subtitles. The processor is coupled to the memory and executes the program instructions to (i) generate two probabilities per input word $w_i$: the probability $p_{B,i}$ of inserting a segment boundary after position i, and the probability $1-p_{B,i}$ of the complementary event; and (ii) build segmented text output with word, line and frame boundaries.

The penalties defined to the system may include a character limit, number of lines, similar line lengths and expected line length penalties. The program instructions may include instructions corresponding to a beam search decoder that allows optimization of the segmentation by facilitating scoring no boundary, line boundary and subtitle boundary at the end of each word. The neural models may facilitate translation between language pairs associated with segmented text streams.

According to another embodiment of the invention, a method of generating subtitles based on neural models includes providing a neural model having a word embedding layer, a pair of LSTM layers and a softmax layer configured to input text streams and output a probability of a segment boundary after each word; providing penalties and constraints in a memory; and processing an input stream of text based on the neural models, penalties and constraints to generate a segmented output text stream with word, line and frame boundaries. The penalties may include a character limit, number of lines, similar line lengths and expected line length penalties. The method may further include applying a beam search decoder that allows optimization of the segmentation.

BRIEF DESCRIPTION OF THE FIGURES

Embodiments of the present invention will be more fully appreciated with reference to the appended drawing figures.

DETAILED DESCRIPTION

Figure 1:
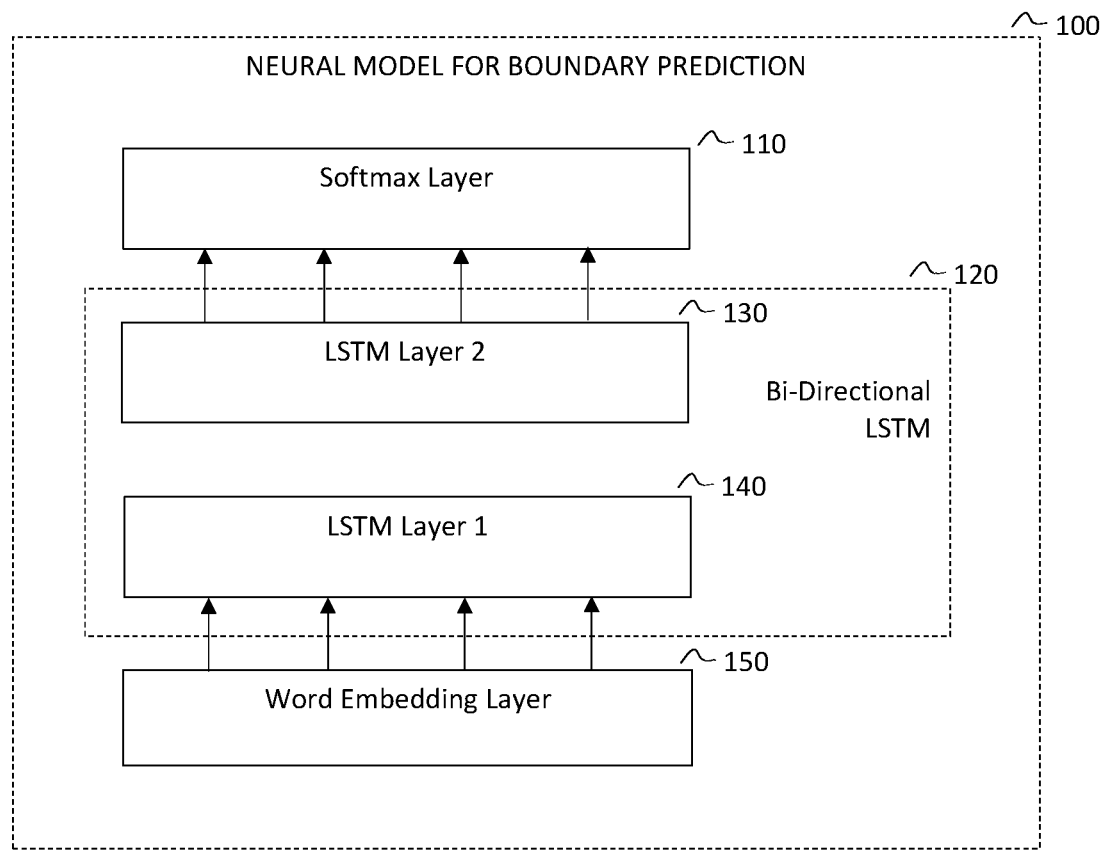
FIG. 1 depicts an illustrative neural network model for application in a subtitle segmentation method and system according to an embodiment of the present invention.

According to an embodiment of the invention, a neural machine translation system may be implemented for translation of subtitles in the domain of entertainment. The neural translation model may be adapted to the subtitling content and style and extended by a technique for utilizing intersentence context for short sentences such as dialog turns. A novel subtitle segmentation algorithm may be implemented that predicts the end of a subtitle line given the previous word-level context using a recurrent neural network learned from human segmentation decisions. This model may be combined with subtitle length and duration constraints established in the subtitling industry and may be shown to increase productivity, for example, up to 37% as compared to translating from scratch and significant reductions in human translation edit rate in comparison with the post-editing of the baseline non-adapted system without a learned segmentation model.

A. Introduction

In recent years, significant progress was observed in neural machine translation (NMT), with its quality increasing dramatically as compared to the previous generation of statistical phrase-based MT systems. However, user acceptance in the subtitling community has so far been rare. One reason for this is that state-of-the-art off-the-shelf NMT systems do not address the issues and challenges of the subtitling process in full.

According to one embodiment of the present invention, NMT systems may be customized for subtitling, with focus on the entertainment domain. From the user perspective, the quality of translation and subtitle segmentation can improve the generation of subtitles in such a way that significantly reduced post-editing is required. The introduction of such customized subtitle and subtitle segmentation systems should lead to greater user acceptance in the subtitling industry and contribute to the wider adoption of NMT technology with the subsequent benefits the latter brings in terms of productivity gain and time efficiency in subtitling workflows.

Below, we present a review of related work in Section B. Section C describes an embodiment of a baseline NMT system according to an embodiment of the present invention and how it compares to NMT systems from previous research. Section D presents the details of the changes to the MT system that may be implemented to boost performance for the subtitling tasks for the entertainment domain, with a focus on Latin American Spanish as the target language. Section D describes an embodiment of a novel algorithm for automatic subtitle segmentation that may be combined with rule-based constraints to correct subtitle representation on the screen.

B. Related Work

Evaluation of post-editing time and efficiency gain was presented by (Etchegoyhen et al., 2014) on multiple language pairs and with many posteditors. However, that work only evaluated statistical MT systems, whereas here we evaluate a neural MT system. Also, the aspect of subtitle segmentation was not explicitly considered there. It was not clear what segmentation was used, if at all. Interesting findings on evaluation of statistical MT for subtitling in production can be found in the work of (Volk et al., 2010), who perform an extensive subjective error analysis of the MT output. Aspects of customizing MT, again statistical, using existing subtitle collections are discussed in (Muller and Volk, 2013). There appears to have been little on subtitle segmentation which targets segmentation of MT output. The work by (Ivarez et al., 2017) uses conditional random fields and support vector machines to predict segment boundaries. Here, by contrast, described embodiments use recurrent neural networks. That algorithm is evaluated in terms of monolingual postediting effort in the work of (Ivarez Muniain et al., 2016). (Lison and Meena, 2016) predict dialog turns in subtitles, which is related to subtitle segmentation, but is outside the scope of the embodiments described herein. (Song et al., 2019) deals with predicting sentence-final punctuation within non-punctuated subtitles using a longshort-term memory network (LSTM). That model and (Tilk and Alumae, 2015) use punctuation prediction with LSTM. Embodiments of the present invention, by contrast, address subtitle segmentation, which is more complex and less well-defined than prediction of punctuation.

C. A Baseline NMT Architecture

We trained our NMT models using an open-source toolkit (Zeyer et al., 2018) that is based on Tensor-Flow (Abadi et al., 2015). We trained an attention based RNN model similar to (Bandanau et al., 2015) with additive attention. The attention model projects both the source and the target words into a 620-dimensional embedding space. The bidirectional encoder consists of 4 layers, each of which uses LSTM cells with 1000 units. We used a unidirectional decoder with the same number of units. In the initial (sub)epochs, we employed a layer-wise pretraining scheme that resulted in better convergence and faster overall training speed (Zeyer et al., 2018). We also enhanced the computation of attention weights using fertility feedback similar to (Tu et al., 2016; Bahar et al., 2017). The training data was preprocessed using Sentencepiece (Kudo and Richardson, 2018), with 20K and 30K subword units estimated separately for English and Spanish, respectively, without any other tokenization. In training, all our models relied on the Adam optimizer (Kingma and Ba, 2015) with a learning rate of 0.001. We applied a learning rate scheduling according to the Newbob scheme based on the perplexity on the validation set for a few consecutive evaluation checkpoints.

We also employed label smoothing of 0.1 (Pereyra et al., 2017). The dropout rate ranged from 0.1 to 0.3. According to one embodiment, a baseline general-domain NMT system operating as a single system may obtain a case sensitive BLEU score of 34.4% on the WMT newstest 2013 En-Es set1.

D. NMT Adaptation

Domain and Style Adaptation

Film content covers a large variety of genres, thus it is not easy to characterize the domain of these type of data. However, subtitles typically have shorter sentences than general texts (e.g. news articles), and brief utterances abound in many films. To create a customized system for subtitles, an embodiment uses the OpenSubtitles parallel data2, downloaded from the OPUS collection (Lison and Tiedemann, 2016), as the main training corpus. The corpus may be filtered by running FastText based language identification (Joulin et al., 2016) and other heuristics (e.g. based on source/target lengths and length ratios in tokens and characters). In addition, an emboiment may use other conversational corpora, such as GlobalVoices, transcribed TED talks and in-house crawled English-Spanish transcripts of the EU TV as parallel training data. An embodiment may also add, for example, Europarl and News Commentary data to the main training corpus as sources of clean and well-aligned sentence pairs. Other sources may also be similarly added.

Neural MT systems often have problems translating rare words. To mitigate this problem, an embodiments incorporates a novel data augmentation technique. First, the technique involves computing word frequency statistics for the main training corpus described above. Then, auxiliary out-of-domain training data may be defined from which we wanted to extract only specific sentence pairs. These data included all other publicly available training data, including ParaCrawl, CommonCrawl, EUbookshop, JRCAcquis, EMEA, and other corpora from the OPUS collection. Word frequencies for each of these auxiliary corpora may be computed individually. Next, for each sentence pair in each auxiliary corpus, according to one embodiment, check that:
   either the source or the target sentence has at least one word that is rare in the main corpus, and neither the source sentence, nor the target sentence includes any word that is out-of vocabulary for the main training corpus and at the same time is rare in the auxiliary corpus.

A word may be defined to be rare if its frequency is less than 50. The the total number of running words we add (counted on the source side) may be limited, for example, to 100M per auxiliary corpus. This may be done to avoid oversampling from large, but noisy corpora such as CommonCrawl. In practice, for the En-Es training data, 145M words of auxiliary data may be added according to one embodiment, which is ca. 17% of the auxiliary training data that was available. Overall, according to one embodiment of the invention, ca. 39M lines of parallel training data for training may be used, with for example, 447M running words on the English and 453M running words on the Spanish side. Additional domain adaptation may include finetuning of the trained model with a reduced learning rate on in-domain data, as e.g. in the work of (Luong and Manning, 2015). Additional fine tuning may be performed. When aiming to cover all possible film genres, additional fine-tuning may or may not be implemented.

Handling Language Variety

Most MT systems do not differentiate between European and Latin American Spanish as the target language, providing a single system for translation into Spanish. However, significant differences between the two language varieties require the creation of separate subtitles for audiences in Latin America and Spain. Almost no parallel corpora are available for training NMT systems, in which the target language is explicitly marked as Latin American (LA) Spanish, and the majority of the public corpora represent European Spanish (such as proceedings of the European Parliament). However, large portions of the in-domain OpenSubtitles corpus contain Latin American Spanish subtitles. We follow a rule-based approach to label those documents/movies from the OpenSubtitles corpus as translations into LA Spanish. If the plural form of the word "you" is "ustedes" that is used in Latin American Spanish, then according to one embodiment, the whole document is labeled as belonging to this language variety. Since this word is used frequently in movie dialogues, a significant number of documents may be labeled as belonging to LA Spanish (a total of 192M running words when counted on the Spanish side of the parallel data).

According to one embodiment, training a multilingual system may proceed according to known procedures and neural architectures, such as (Firat et al., 2016). A special token at the beginning of the source sentence may be added to signal LA Spanish output for all training sentence pairs which may be labeled as translations into LA Spanish with the rule-based method described above. A development set may be labeled according to one embodiment as having translations into LA Spanish to track convergence and for selection of the final training epoch.

Towards Document-Level Translation

Subtitles often contain short sentences which, when translated by NMT individually, provide very little context for correct translation of certain words and phrases, such as pronouns. Yet this context is available in preceding sentences. As a step towards document-level translation, according to one embodiment a training corpus may be created of Open Subtitles in which are spliced two or more consecutive subtitles from the same film, as well as their translations, until a maximum length of K tokens is reached on the source side. A special separator symbol may be inserted between each pair of spliced sentences both on the source and the target side. The idea here is that the NMT system according to one embodiment learns to produce these separator symbols and learns not to re-order words across them, so that the original sentence segmentation can be restored. At the same time, because of the nature of the recurrent model, the context of the previous sentences would also be memorized by the system and would affect the translation quality of the current sentence.

According to one embodiment, two copies of OpenSubtitles corpus may be created of only spliced sentence pairs with K=20 and K=30, respectively. This corpus may be used in training together with all the other data described above. During inference, consecutive short sentences may be spliced from the same film until a threshold of K=20 tokens is reached and then used to translate the resulting test set. (Tiedemann and Scherrer, 2017) use a single previous translation unit with a separator symbol as additional context.

Each sentence may be according to an embodiment of the invention translated only once, either as part of a spliced sentence sequence or as an individual (long) sentence. A possibly better, but more redundant approach may involve cutting out the translation of only the last sentence in a spliced sequence, and then re-sending the corresponding source sentence as context for translating the next sentence. Additionally, encoding the previous inter-sentence context in a separate neural component may be used in document level translation. Even the first step towards expanding context beyond a single sentence described above may lead to some improvements in translation, and in particular pronoun disambiguation.

E. Subtitle Segmentation

The output of a neural machine translation ("NMT") system to support subtitling should be formatted in an appropriate way when displayed on the screen. Typically, there exists a fixed character limit per line. The number of lines should not exceed two and the text in a subtitle has to be as long as needed to match the user's reading speed, so that it is possible for viewers to read the subtitle and also watch the film at the same time. Beyond that, we want line and subtitle boundaries to occur in places where the flow of reading is harmed as little as possible.

While the first requirements can reliably be implemented as hard rules, optimizing boundaries for readability is more subtle and a lack thereof can easily expose the subtitle as being machine generated, especially when compared to a professionally created one. Punctuation and part-of-speech information can already indicate possible segmentation points, however in general finding good boundaries is not straight-forward and depends on the meaning of what is being said.

According to an embodiment, a neural model to predict segment boundaries may be advantageously deployed. FIG. 1 depicts an illustrative neural model 100 according to an embodiment of the present invention. It consists of a 128-dimensional word embedding layer 150 that inputs words ($w_i$) to be processed, two 256-dimensional bi-directional LSTM layers 130 and 140 coupled to the word embedding layer, followed by a softmax layer 110 that is coupled to the LSTM layers. The output of the softmax layer is a binary decision, i.e. it generates two probabilities per input word $w_i$: the probability $p_{B,i}$ of inserting a segment boundary after position i, and the probability $1-p_{B,i}$ of the complementary event.

The model according to an embodiment of the invention is trained on the OpenSubtitles2018 corpora of the Opus Project, which we tokenize and convert to lower-case. The data comes in XML format, including annotated sentence boundaries and timestamps for the subtitle units. We use all subtitle boundaries occurring in between words of a sentence as ground truth labels. Training is performed on all sentences containing at least one subtitle boundary, leading to a corpus size of 16.7M sentences for Spanish and 3.8M sentences for Russian.

To enforce the additional requirements mentioned above, we integrate the neural segmentation model into a beam search decoder. The search happens synchronous to the word positions of the input. At each step there are three possible expansions of the partial hypotheses: no boundary, line boundary, or subtitle boundary after the current word. The natural logarithm of the according segmentation model probability is used as score (making no distinction between line and frame boundaries). Penalties for the following auxiliary features are subtracted:

1. character limit: penalty $q_1=\infty$ if a line is longer than allowed
2. number of lines: penalty $q_2$ for every line exceeding two in a given subtitle
3. similar line lengths: penalty $q_3$ per difference in length of subsequent lines within a subtitle, measured in characters
4. expected subtitle lengths: penalty $q_4$ per deviation from expected subtitle lengths, measured in characters; we expect subtitle lengths to be as in the source language, only scaled according to the different sentence length The third feature generally lead to geometrically pleasing line lengths. In particular, it avoids orphans, i.e. lines with very few words in them. The fourth feature attempts to keep the translation in sync with the video by keeping the number of characters in a subtitle similar to the source language. This also means that the subtitle duration will be suited for a similar reading speed as that set in the source file. As a side effect, this feature ensures that we predict the right number of subtitle boundaries for a given sentence.

The fourth feature is specific to subtitle translation, as it requires subtitle lengths on the source side. In the use case of captioning (i.e. speech recognition without translation) the algorithm is free to choose the number of time segments for a given subtitle. The start and end times are taken from time information for each word, as provided by the speech recognizer.

During search, according to an embodiment a beam size of 10 may be sufficient. Other beam sizes may be used. The penalties according to an embodiment are set to $q_2=10$, $q_3=0.1$ and $q_4=1$. Furthermore, a margin of 20% and 30% of the line and subtitle lengths for features 3 and 4, respectively, may be used in which no penalty is applied.

Figure 2:
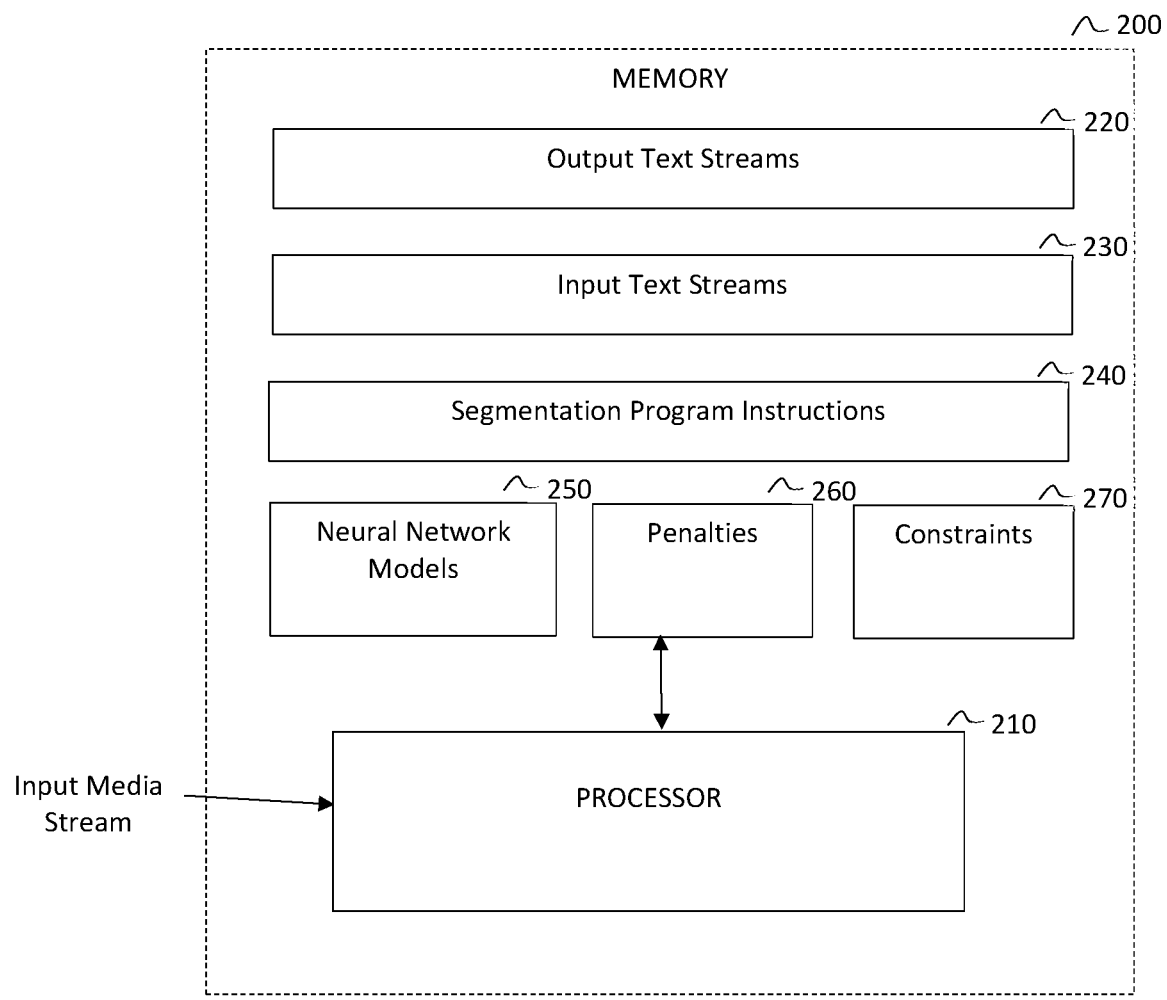
FIG. 2 depicts an illustrative subtitle segmentation system according to an embodiment of the present invention.

The system for automatic subtitling described herein includes neural models, penalties and constraints associated with a subtitle type format that may vary from system to system. An illustrative embodiment is shown in FIG. 2. Referring to FIG. 2, the neural models 250, penalties 260 and constraints 270 may be stored in a segmentation system memory 200 along with input text streams 230 arriving in real time or otherwise made available to the memory and output streams 220. A processor 210 may be coupled to memory to process the input streams, including input text streams, according to the models, constraints and penalties. The constraints may specify other parameters associated with the subtitle output including the number of permitted characters per line and other similar constraining information. The memory may further store algorithms and program instructions 240 for processing the text into segmented text as described herein, including incorporating beam search. The processor executes the program instructions to perform the steps and aspects of the segmentation functionality described herein. The training of the neural models may be done on a corpus of content, including television shows and other media as described herein. In addition, the text stream may be provided to the segmentation system from a speech recognition system, a machine translation system, or any other source of a stream of text that needs to be segmented for presentation to a user.

While particular embodiments have been shown and described herein, one of ordinary skill in the art will understand that changes may be made to those embodiments without departing from the spirit and scope of the invention.

What is claimed is:

1. A segmentation system incorporating neural models associated with the output of a text generation system, comprising:
   a memory that stores text, segmentation penalties, a trained neural model comprising a word embedding layer, at least two bi-directional LSTM layers and a softmax layer, and program instructions for segmenting subtitles, using the text, the segmentation penalties, and the trained neural model, wherein the penalties include a character limit, number of lines and similar line lengths;
   a processor, coupled to the memory, the processor configured to execute the program instructions to (i) generate two probabilities per input word $w_i$: the probability $p_{B,i}$ of inserting a segment boundary after position i, and the probability $1-p_{B,i}$ of the complementary event; and (ii) build segmented text output with word, line and frame boundaries.

2. The system according to claim 1, wherein the penalties include expected line length penalties.

3. The system according to claim 1, wherein the program instructions further comprise instructions corresponding to a beam search decoder that allows optimization of the segmentation.

4. The system according to claim 1, wherein the neural models facilitate translation between language pairs associated with subtitle text streams.

5. The system according to claim 1, wherein the penalties include an expected line length to minimize orphaned text.

6. The system according to claim 1, wherein the beam search facilitates scoring no boundary, line boundary and subtitle boundary at the end of each word.

7. A method of generating subtitles based on neural models, comprising:
   providing a neural model having a word embedding layer, a pair of LSTM layers and a softmax layer output a probability of a segment boundary after each word;
   providing penalties and constraints in a memory;
   processing an input stream of text based on the neural models, the penalties and constraints to generate a segmented output text stream with word, line and frame boundaries, wherein the penalties include a character limit, number of lines, and expected line length penalties.

8. The method according to claim 7, wherein the penalties include similar line lengths.

9. The method according to claim 7, wherein the processing includes applying a beam search decoder that allows optimization of the segmentation.

10. The method according to claim 1, wherein the neural models facilitate translation between language pairs associated with subtitle text streams.

11. The method according to claim 9, wherein the beam search facilitates scoring no boundary, line boundary and subtitle boundary at the end of each word.

12. The method according to claim 7, wherein to generate the segmented output text stream with word, line and frame boundaries further comprises adjusting a value corresponding to the probability $p_{B,i}$ of inserting a segment boundary after position i, using a value corresponding to one of segmentation penalties relating to a difference between a first subtitle length of a first subtitle containing the word $w_i$ and a second subtitle length of a reference subtitle.

13. The method according to claim 12, wherein
the first subtitle and the reference subtitle relate to a video;
the first subtitle is in a first natural language;
the reference subtitle is in a second natural language;
the processor is further configured to execute the program instructions to translate the reference subtitle from the second natural language to the first natural language to create the first subtitle; and
the one of the segmentation penalties relating to a difference between the first subtitle length and the second subtitle length is configured to:
 maintain synchronization of the first subtitle with a portion of the video where a corresponding portion of the reference subtitle is displayed, and
 maintain a first reading speed of the first subtitle that is similar to a reading speed of the second subtitle.

* * * * *